United States Patent
Ray et al.

(10) Patent No.: US 6,811,190 B1
(45) Date of Patent: Nov. 2, 2004

(54) TAB-LOCK FASTENER FOR INTERLOCKING VENT PIPE

(75) Inventors: Shaun Ray, Wichita, KS (US); Todd Bridge, Wichita, KS (US)

(73) Assignee: Metal-Fab, Inc., Wichita, KS (US)

( * ) Notice: Subject to any disclaimer, the term of this patent is extended or adjusted under 35 U.S.C. 154(b) by 0 days.

(21) Appl. No.: 10/215,682

(22) Filed: Aug. 8, 2002

Related U.S. Application Data

(60) Provisional application No. 60/311,147, filed on Aug. 9, 2001.

(51) Int. Cl.$^7$ ................................................ F16L 21/00
(52) U.S. Cl. ...................................... 285/402; 285/361
(58) Field of Search ................................ 285/401, 402, 285/403, 360, 361

(56) References Cited

U.S. PATENT DOCUMENTS

| | | | | |
|---|---|---|---|---|
| 24,100 A | * | 5/1859 | Chamberlin | 285/402 |
| 211,164 A | * | 1/1879 | Klein | 285/401 |
| 261,473 A | * | 7/1882 | Naughten | 285/402 |
| 383,360 A | * | 5/1888 | Kefer | 285/361 |
| 604,019 A | * | 5/1898 | Carroll et al. | 285/401 |
| 605,263 A | * | 6/1898 | Tharp | 285/401 |
| 830,907 A | * | 9/1906 | Lund | 285/402 |
| 985,094 A | * | 2/1911 | Zachara | 285/402 |
| 1,038,948 A | * | 9/1912 | Patrick | 285/361 |
| 1,051,461 A | * | 1/1913 | Smith | 285/402 |
| 1,128,634 A | * | 2/1915 | Talbot | 285/402 |
| 1,727,779 A | * | 9/1929 | Marengo | 285/403 |
| 2,936,184 A | * | 5/1960 | Epstein | 285/402 |
| 2,959,196 A | * | 11/1960 | Truesdell et al. | 285/402 |
| 4,611,662 A | * | 9/1986 | Harrington | 285/3 |
| 4,911,573 A | * | 3/1990 | Pietro | 285/361 |
| 5,651,732 A | * | 7/1997 | Dufour | 285/361 |
| 6,206,433 B1 | * | 3/2001 | Bloomer | 285/88 |

* cited by examiner

Primary Examiner—David Bochna
(74) Attorney, Agent, or Firm—Fellers, Snider, et al.; Bill D. McCarthy

(57) ABSTRACT

The present invention provides a tab-lock fastener for connecting first and second vent pipes typically used to exhaust products of combustion of natural gas appliances. The tab-lock fastener includes a guide and a tab-lock receptacle formed on a male end of the first vent pipe, an engaging tab formed on a female end of the second vent pipe, and a locking tab formed on the female end of the second vent pipe. The first and second vent pipes are assembled by inserting the male end of the first vent pipe into the female end of the second vent pipe so that the engaging tab is received in the guide and twisting one of the vent pipes with respect to the other vent pipe. The locking tab engages a wall of the tab-lock receptacle to prevent untwisting and unwanted disconnection of the vent pipes.

15 Claims, 7 Drawing Sheets

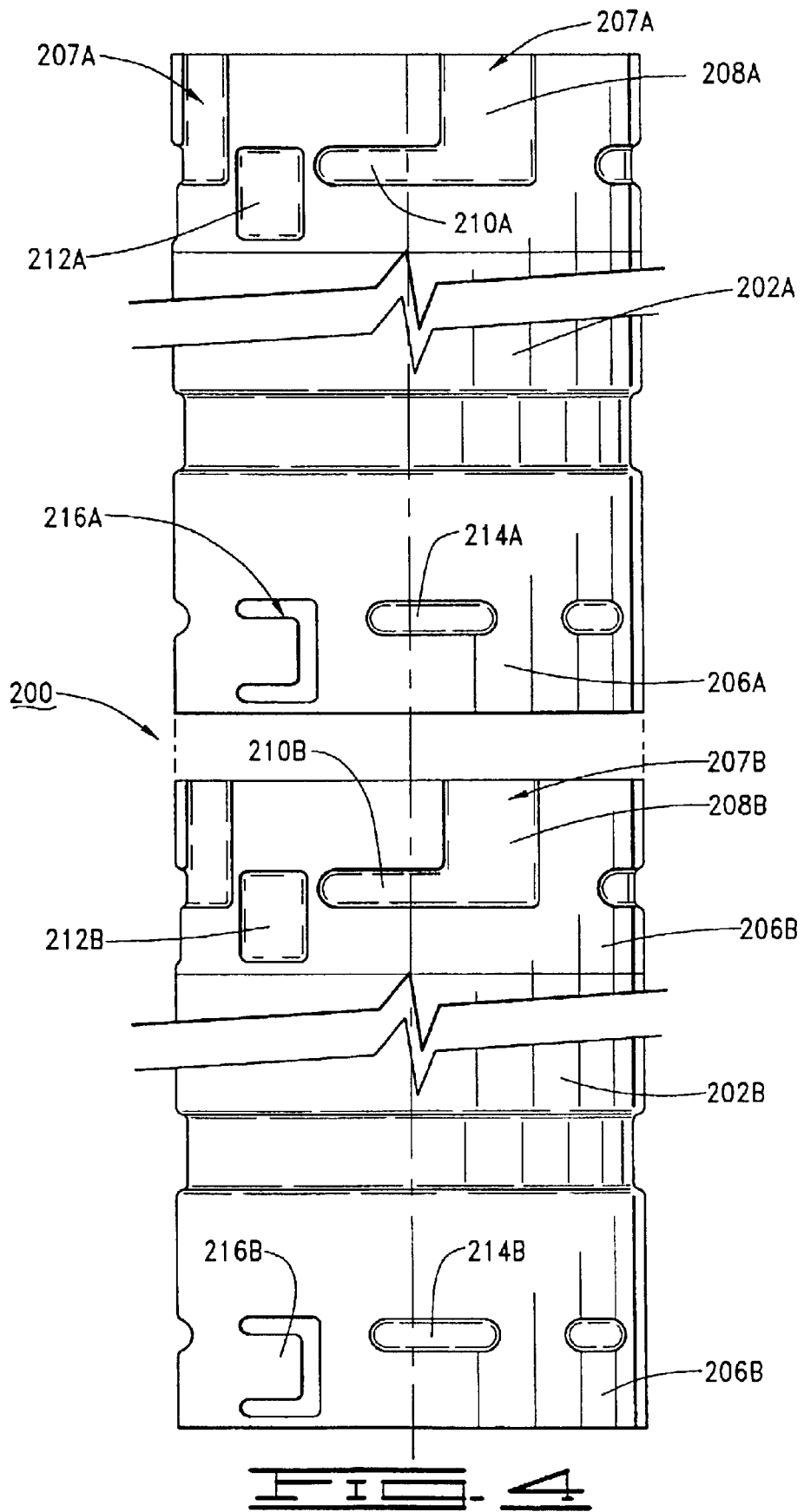

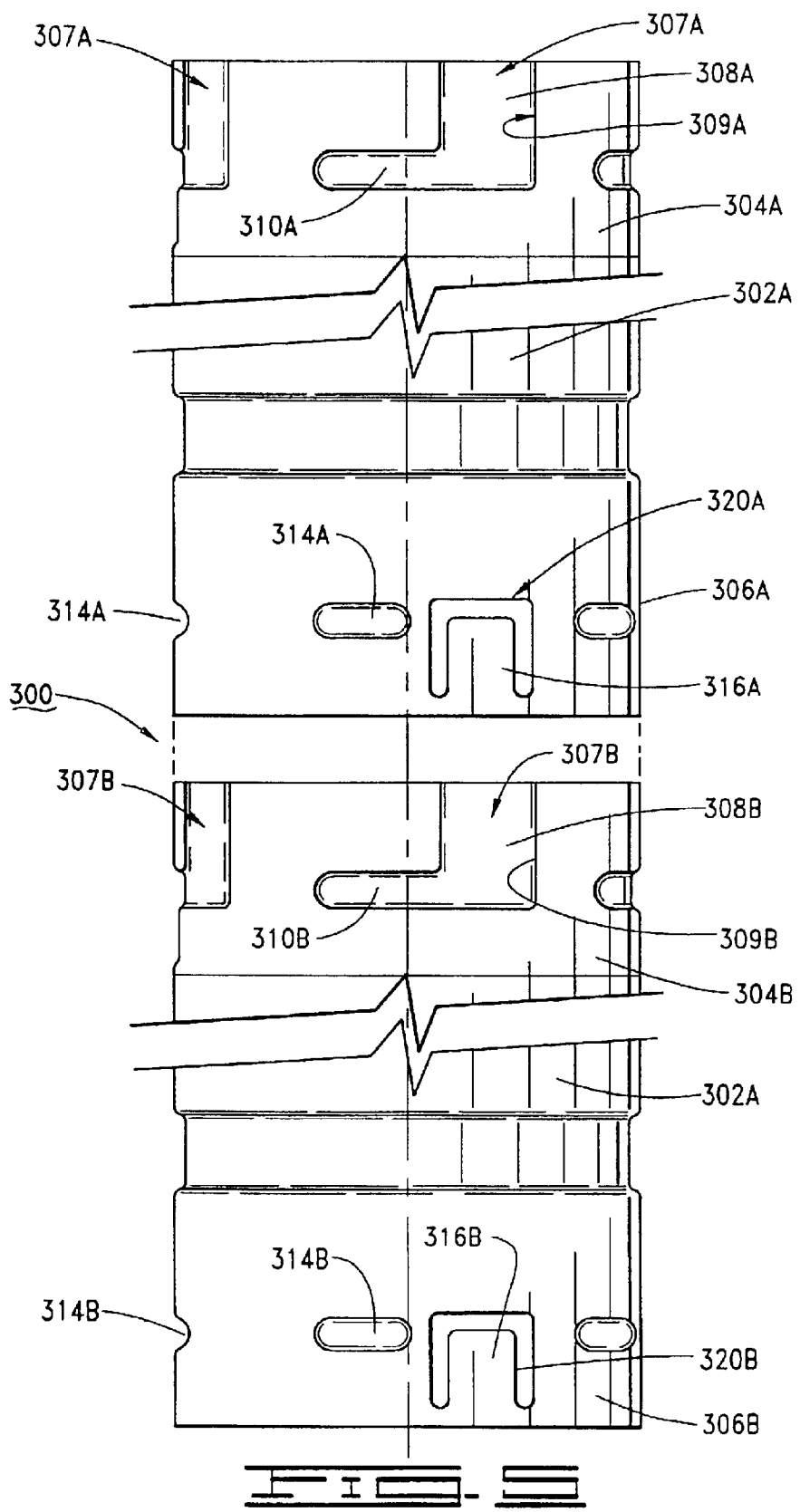

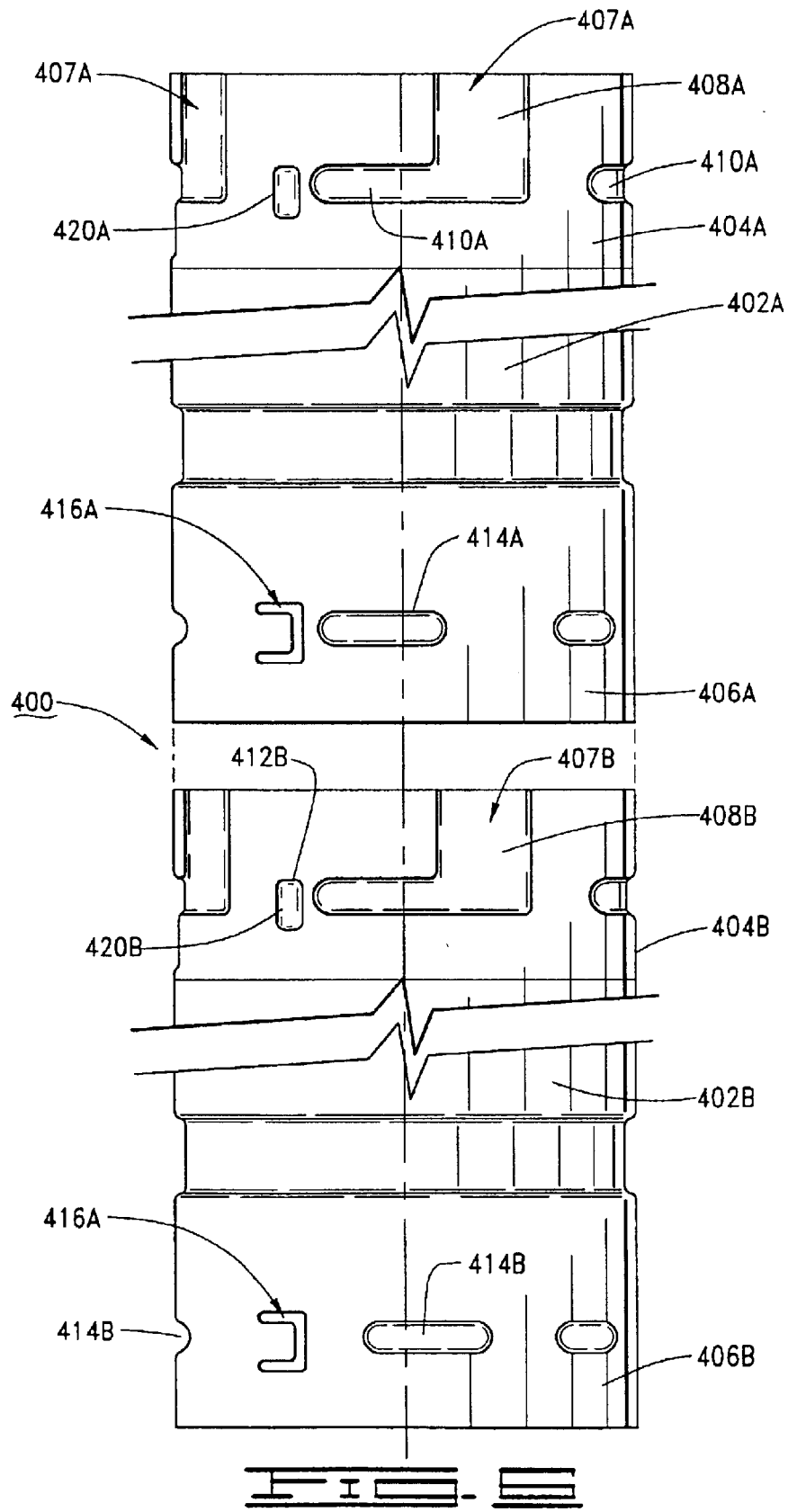

TAB-LOCK FASTENER FOR INTERLOCKING VENT PIPE

This application claims the benefit of Provisional application No. 60/311,147, filed on Aug. 9, 2001.

FIELD OF THE INVENTION

The present invention relates generally to vent pipe and more specifically, but not by way of limitation, to a tab-lock fastener for interlocking vent pipe sections.

BACKGROUND

Vent pipes and chimneys are commonly found in homes to vent the products of combustion to the atmosphere. Home appliances such as space heaters, decorative fireplaces, hot water heaters, and wood-burning stoves typically include vent pipes. The vent pipes are usually made from a ductile material, such as sheet metal, and are assembled in place and installed to custom fit the vent pipe to a given space. Vent pipes are usually located between walls, in attics and in crawl spaces where there is little room to work. As a result, the manipulation of the vent pipes is difficult, particularly with regard to connecting vent pipe sections.

Over the years, local regulatory codes have also become more stringent regarding the sealing of the vent pipes to prevent leaking of the gaseous combustion products into a living space and to generally improve energy efficiency. Accordingly, the connection between adjoining sections of vent pipe must be secure to avoid venting combustion products to the living space.

There have been devices for connecting adjoining sections of vent pipe. For example, U.S. Pat. No. 4,874,191 issued to Green teaches a flue gas conduit connector for joining together ends of lengths of flue gas conduit. The lengths are locked by means of locking tabs on the outer surface of one of the flue gas conduits. The tab is bent over a locking ring on the other flue gas conduit. The two ends are provided with complementary taper joints and a sealing gasket to provide a leak-proof flue passage.

While functional, the vent pipe connectors taught by Green U.S. Pat. No. 4,874,191, and by others, can be time-consuming and cumbersome to install. In the past, some vent pipe installers have used sheet metal screws to secure vent pipe joints. Although this practice is not widely accepted, some installers have adopted it as a necessary measure to ensure that vent pipe joints will not part accidentally during other stages of construction. For example, a vent pipe can be subjected to accidental disassembly when a termination cap located at the top of a gas vent pipe assembly is removed to allow installation of roofing materials, such as shingles and flashings.

When inserting sheet metal screws into vent pipe joints, an installer must use tools and sheet metal screws that are not supplied with the vent pipe. Another drawback occurs when using sheet metal screws with a double-wall vent pipe, such as a B-vent. A B-vent is a double-wall vent pipe that typically has a sheet metal outer wall and an aluminum inner wall, and an installer can accidentally drive a sheet metal screw through both the outer and inner walls of the assembly. Penetration of the inner wall is usually unacceptable and requires the installer to remove and reinstall the B-vent. Additionally, the use of sheet metal screws can result in an undesirable, audible ticking noise during the heating and cooling cycles of the gas vent under normal use. This ticking noise is caused by the sheet metal screw being positioned next to, and contacting, the aluminum inner wall of the gas vent pipe.

There exists a need for a connector to join vent pipe sections that is easy to work with, that can be quickly installed, and that maintains the structural integrity of the vent pipe sections.

SUMMARY OF THE INVENTION

The present invention is directed to a tab-lock fastener for vent pipe for connecting vent pipe sections such as is typically used to exhaust combustion products of natural gas appliances. The tab-lock fastener includes an locking tab formed on female end of a first vent pipe section and a guide groove formed on a male end of a second vent pipe section; also, a locking tab is provided on the female end of the first vent pipe section. The first and second vent pipe sections are assembled by inserting the male end of the first vent pipe section into the female end of the second vent pipe section, the vent pipe sections aligned so that the locking tab of the first vent pipe section is disposed to be in the guide groove of the second vent pipe section. The vent pipe sections are then rotated relative one to the other so that the locking tab is aligned over a tab-lock receptacle formed in the male end of the second vent pipe section. The vent pipe sections are interlocked by bending the locking tab to engage a wall of the tab-lock receptacle to prevent unwanted disconnection of the first vent pipe section from the second vent pipe section.

The features and advantages of the present invention will become apparent upon reading the following detailed description along with the associated drawings and the appended claims.

BRIEF DESCRIPTION OF THE DRAWINGS

FIG. 4 is a side elevation view of two spaced apart, axially aligned sections of gas vent pipe constructed in accordance with another embodiment of the invention.

FIG. 5 is a side elevation view of two spaced apart, axially aligned sections of gas vent pipe constructed in accordance with yet one other embodiment of the invention.

FIG. 6 is a side elevation view of two spaced apart, axially aligned sections of gas vent pipe constructed in accordance with one further embodiment of the invention.

DESCRIPTION

Figure 1:
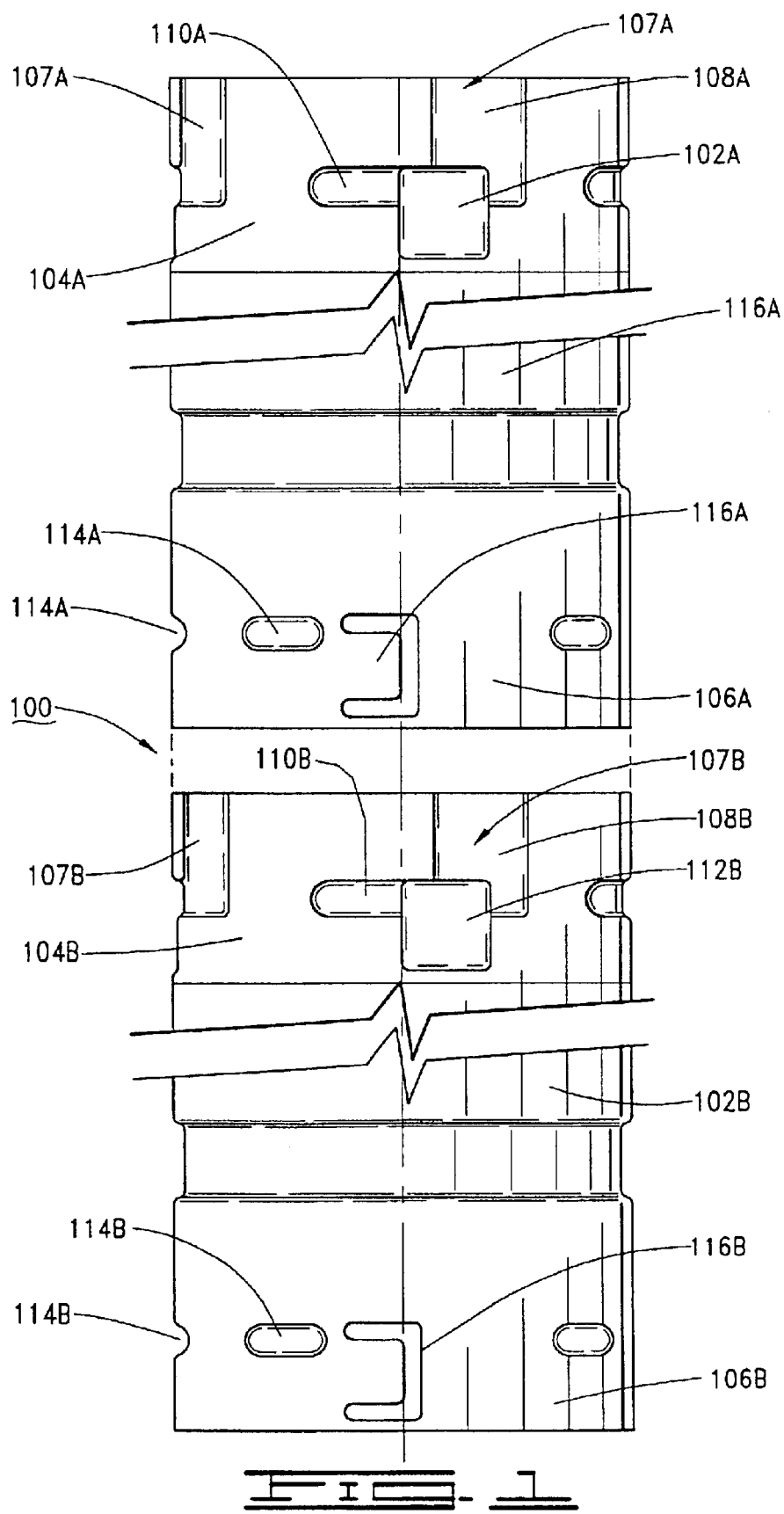
FIG. 1 is a side elevation view of two spaced apart, axially aligned sections of gas vent pipe constructed in accordance with the present invention.

Referring to the drawings in general, and particularly to FIG. 1, shown therein is a tab-lock fastener 100 for a vent pipe, or other ductile pipe, constructed in accordance with the present invention. A first vent pipe section 102A has a formed male end 104A and a formed female end 106A. The male end 104A has four circumferentially spaced about guides or channels 107A, each of which has an entry area 108A, a slot 110A and a tab-lock receptacle 112A. The female end 106A of the first vent pipe section 102A has four circumferentially spaced about, inwardly embossed engaging tabs 114A (only one of which is completely shown in FIG. 1), and a minimum of one locking tab 116A that is preferably formed as an integral part of the first vent pipe section 102A. It will be understood that, while only one locking tab 116A is shown, the first vent pipe section 102A can be constructed with a plurality of such locking tabs.

A second vent pipe section 102B of the vent pipe has a formed male end 104B and a formed female end 106B. The male end 104B has four circumferentially spaced about guides or channels 107B, each having an entry area 108B, a slot 110B and a tab-lock receptacle 112B. The female end 106B has four circumferentially spaced about, inwardly embossed engaging tabs 114B and at least one locking tab 116B preferably formed as an integral part of the first vent pipe section 102B. The term "tab-lock fastener" as used herein includes the locking tab 116A and either the tab-lock receptacle 112B or any other structure which prevents the rotation of the first vent pipe section 102A with respect to the second vent pipe section 102B.

To assemble the first vent pipe section 102A onto the second vent pipe section 102B, an installer axially positions and aligns the engaging tab 114A of the female end 106A of the first vent pipe section 102A directly over the guide channel 107B of the male end 104B of the second vent pipe section 102B. It will be noted that the vent pipe section 102A will need to be slightly rotated from the position shown in FIG. 1 in order to engage the second vent pipe section 102B. After the sections 102A and 102B are aligned for engagement, the vent pipe sections 102A and 102B are pushed towards each other, causing the engaging tabs 114A to slide into the entry areas 108B until the female end 106A overlaps the male end 104B. Next, the first vent pipe section 102A is rotated in a clockwise manner from a top down perspective of the vent pipe, causing the engaging tabs 114A to slide into the slots 110B of the male end 104B. The slots 110B allow the engaging tabs 114A to travel through a limited angular rotation, at which point the engaging tabs 114A will be fully engaged in the male slots 110B. Preferably, the guides 107A and 107B, as well as the engaging tabs 114A and 114B are inwardly embossed.

Figure 2:
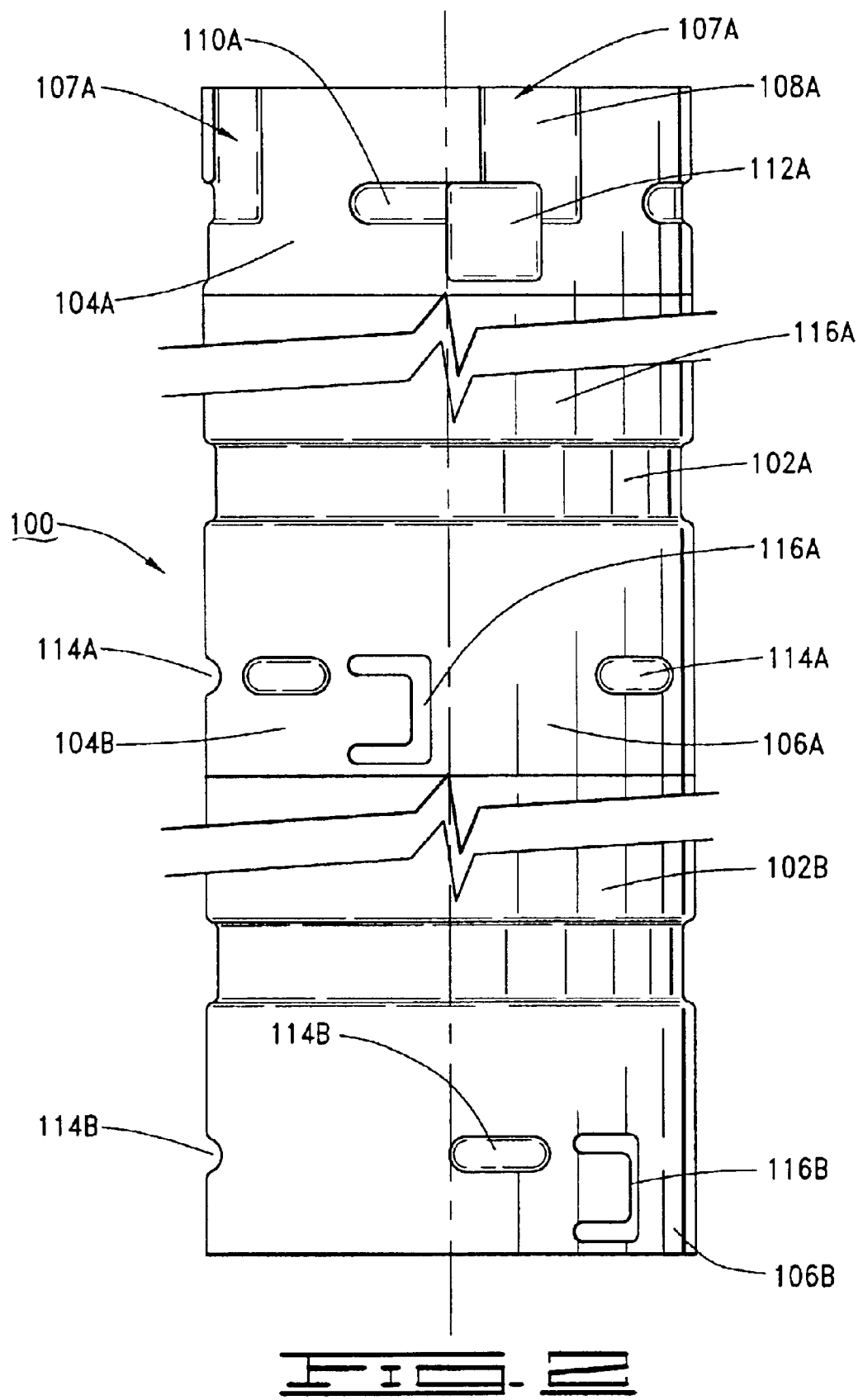
FIG. 2 is a side elevation view of the two sections of gas vent pipe of FIG. 1 joined together.

In FIG. 2, the two vent pipe sections 102A, 102B are joined as the engaging tab 114A is fully engaged into the slot 110B (not visible in FIG. 2). The locking tab 116A on the first vent pipe section 102A is positioned directly over the tab-lock receptacle 112B (not visible in FIG. 2) so that, when the locking tab 116A is pressed inwardly by the installer, the first vent pipe section 102A is locked or secured to the second vent pipe section 102B. The installer can easily deform, or bend, the locking tab 116A to extend inwardly because the vent pipe is made preferably made of a ductile material, such as sheet metal. The locking tab 116A is configured so that the locking tab 116A inelastically deforms when the locking tab 116A is pressed with sufficient force.

Figure 3:
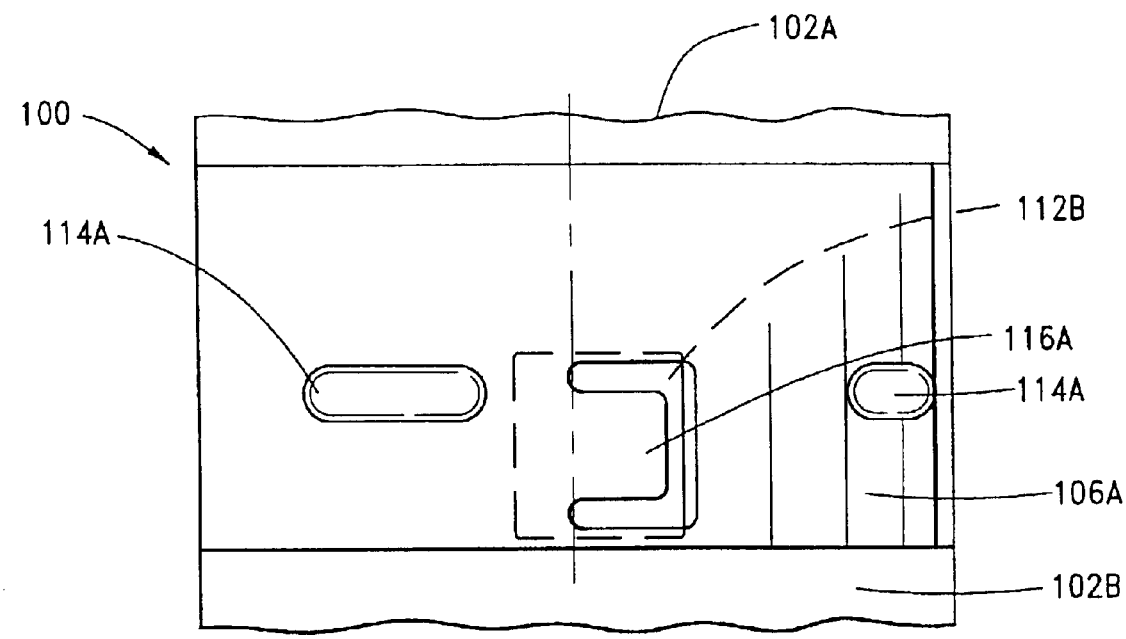
FIG. 3 is an enlarged, detailed view of the gas vent pipes of FIG. 2 with the tab-lock engaged.

FIG. 3 is an enlarged, detailed view of interlocked portions of the vent pipe sections 102A, 102B, shown in FIGS. 1 and 2. The locking tab 116A has been bent inwardly into the tab-lock receptacle 112B. Should an untwisting force be exerted on the gas vent pipe sections 102A, 102B, an edge of the locking tab 116A will move into contact with the wall surface of the rectangularly formed tab-lock receptacle 112B, resulting in an interference that prevents further untwisting of the pipe joint assembly until the locking tab 116A is bent away from interfering engagement with the tab-lock receptacle 112B.

FIG. 4 shows a pair of vent pipe sections 202A, 202B having a tab-lock fastener 200 also constructed in accordance with the present invention. A locking tab 216A is located on female end 206A of the first vent pipe section 202A. A rectangular inward embossment forming a tab-lock receptacle 212B is located on male end 206B of the second vent pipe section 202B. Upon assembly of the vent pipe sections 202A and 202B, the locking tab 216A is bent inwardly to engage the tab-lock receptacle 212B to secure the pipe joint sections 202A, 202B in the manner described above for FIG. 3. For the embodiment of FIG. 4, the tab-lock receptacle 212B is located away from entry area 208B and slot 210B. The tab-lock receptacle 212B, the entry area 208B and the slot 210B form guide channel 207B. The locking tabs 216A, 216B are oriented circumferentially to be positioned over corresponding tab-lock receptacles 2123A, 212B, and lockingly engaged therewith when the tab-lock fastener 200 is interlocked.

Shown in FIG. 5 is another embodiment of the present invention, a tab-lock fastener 300 formed on first and second vent pipe sections 302A, 302B. The design of the tab-lock fastener 300 allows an installer to pre-set a locking tab 316A prior to assembling the joint section. Prior to assembly, the locking tab 316A is pressed inwardly (typically about ¼ inch) and then female end 306A of the first vent pipe section 302A is slipped onto male end 304B of the adjoining second vent pipe section 302B as previously described for other embodiments described hereinabove and shown in FIGS. 1-4. The locking tab 316A pressingly engages the male end 304B of the second vent pipe section 302B twisting the first vent pipe section 302A relative to the second vent pipe section 302B. The locking tabs 316A, 316B are oriented to extend in a longitudinal direction.

Upon fully twisting the first vent pipe section 302A into a fully locked position, an edge 320A of the locking tab 316A travels past edge 309B of the entry area 308B, at which time the elastic memory of the locking tab 316A causes it to extend into the entry area 308B to lock the tab 316A. Thereupon, any accidental disassembly of the first vent pipe section 302A from the second vent pipe section 302B is prevented by the interference of the locking tab edge 320A encountering the wall edge 309B of the entry area 308B. As for the afore described other embodiments, one may disassemble the first vent pipe section 302A from the second pipe section 302B by lifting the locking tab 316A out of the entry area 308B using a prying tool such as a flat blade screwdriver or a small knife blade. For the embodiment of FIG. 5, a portion of the entry area 308B acts as a tab-lock receptacle. Another way of stating this is that the tab-lock receptacle of the tab-lock fastener 300 is located on, or coincident with, the entry area 308B.

In FIG. 6, another embodiment of the present invention, a tab-lock fastener 400 is shown formed on vent pipe sections 402A, 402B. A slotted hole 420B is used in lieu of the inwardly embossed impression used for other embodiments on the male end of the vent pipe sections. Prior to assembly, a locking tab 416 is pressed inwardly (typically about ¼ inch) and female end 406A of the vent pipe is then slipped onto male end 404B of the adjoining vent pipe section. In slipping the female end 406A onto the male end 404B, engaging tabs 414A slide into entry areas 408B and the female end 406A is rotated clockwise (from a top down perspective in FIG. 6) with respect to the male end 404B. In twisting the first vent pipe section 402A with respect to the second vent pipe section 402B until the tab-lock fastener 400 is fully engaged, the locking tab 416A travels over a ridge of receptacle 412B. The receptacle 412B contains a slot 420B sized to permit entry engagement by the locking tab 416A. After the female end 406A is twisted over the ridge of the receptacle 412B past the slot 420B, the female end 406A is then reverse rotated so that the locking tab 416A slips into the slot 420B. The full engagement of the locking tab 416A in the slotted hole 420B prevents inadvertent disjoinder of the tab-lock fastener 400, while providing for disassembly of the vent pipe sections 402A, 402B as may be desired.

To disassemble the vent pipe sections 402A, 402B, the female end 406A is rotated clockwise slightly to disengage the locking tab 416A from the slot 420B; the locking tab 416A is pried outward; the outwardly embossed receptacle 412B is depressed with a prying tool such as a screwdriver; the female end 406A is rotated until the engaging tabs 414A align with the entry areas 408B; and the female end 406A is removed from the male end 404B.

Figure 7:
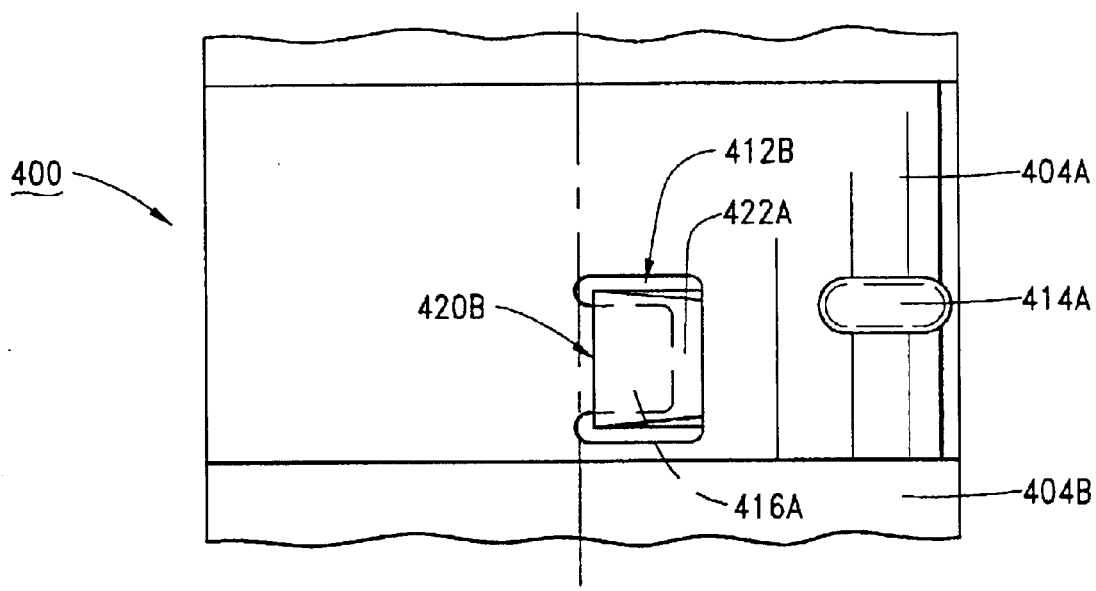
FIG. 7 is an enlarged, detailed view of the gas vent pipe of FIG. 6 with the tab-lock engaged.

FIG. 7 is an enlarged, detailed view showing the engaged locking tab 416A of the tab-lock fastener 400. An edge 422A of the locking tab 416A is shown engaged in the slot 420B. The locking tab 416A is shown in a dashed line because the locking tab is not itself visible when the locking tab 416A is engaged in the inwardly-embossed receptacle 412B.

Each of the embodiments shown in FIGS. 1-7 represent a ductile pipe that is single-wall and, as well, double-wall ductile pipe, such as B-vent, Direct-Vent, or factory built chimney pipe. For the double-wall embodiments, only an outer wall is visible in FIGS. 1-7.

Figure 8:
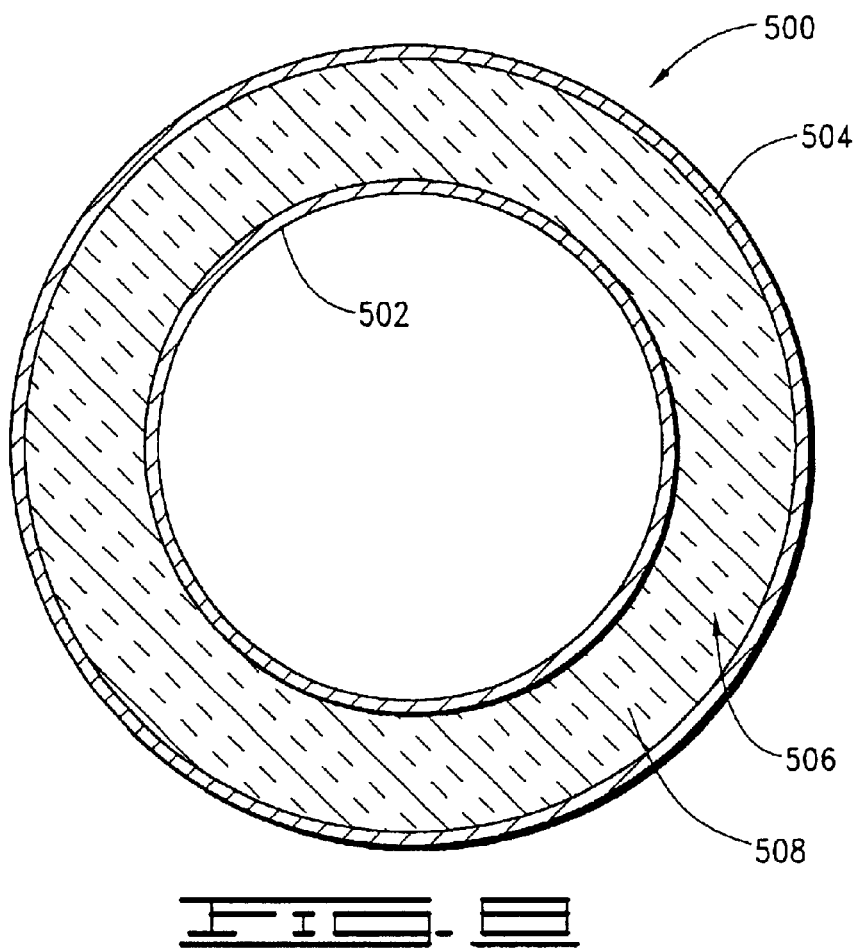
FIG. 8 is a cross-sectional view of a double-wall vent pipe section.

The present invention is not limited by the kind of pipe on which the tab-lock fastener is used. For illustration purposes only, one typical vent pipe is shown in cross-section in FIG. 8. Shown therein is a cross-section of a double-wall vent pipe 500 having an inner wall 502 and an outer wall 504, there being an annular space 506 formed between the inner and outer walls 502, 504. The inner wall 502 of the vent pipe 500 is supported concentrically by a spacer (not shown) inside the outer wall 504. For some applications, such as in the instance of chimney pipe, the annular space 506 contains an insulation material 508; in some other cases, the annular space may be air. Typically both the inner and outer walls are made of a ductile material; sometimes, the inner and outer walls will be made of the same material, while in other cases, the inner wall may be made of different materials, for example, the inner wall may be made of aluminum while the outer wall is made of steel.

Figure 9:
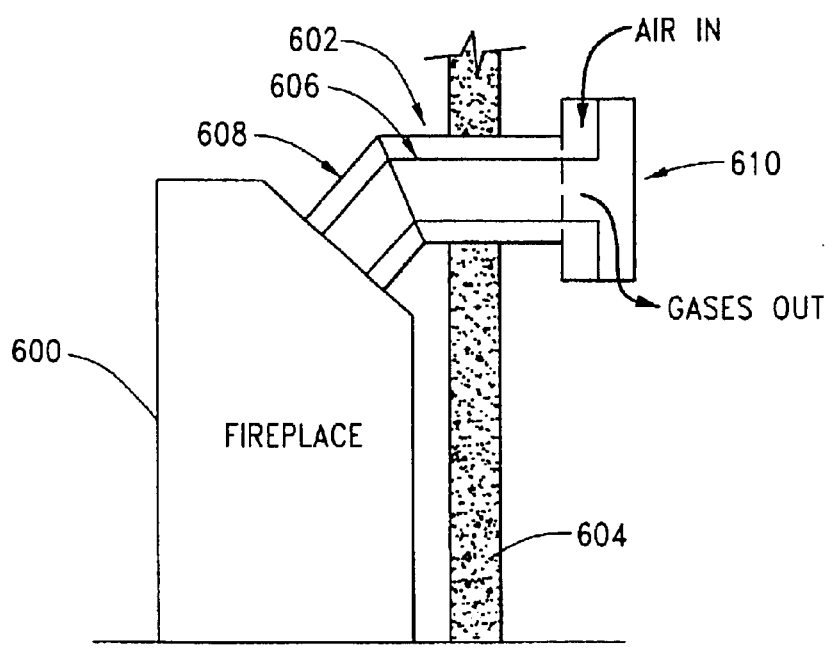
FIG. 9 is a schematic view of a typical installation of a fireplace using a double-wall vent pipe.

Shown in FIG. 9 is a typical installation incorporating the present invention. Shown therein is a sealed combustion appliance, such as a decorative fireplace 600, having a double wall vent pipe 602 that has been made up of vent pipe sections of the type described hereinabove. The vent pipe 602 is connected to the fireplace 600 and extends to an exterior wall 604 (or to a ceiling or roof) to vent combustion gases and to entrain air to support combustion. The fireplace 600 typically contains a fire chamber in which a gas flame is supported on ceramic logs to generate heat for a living space. In the installation illustrated in FIG. 9, the double wall vent pipe 602 penetrates the exterior wall 604 of the living space. The combustion gases from the fireplace 600 are vented through a tubular space defined by an inner wall 606 of the vent pipe 602. Air needed to sustain combustion is supplied to the fireplace 600 through an annular region defined between the inner wall 606 and an outer wall 608 of the vent pipe 602. A vent cap 610 on the distil end of the double wall vent pipe 602 prevents birds, debris and other contaminants from entering the vent pipe 602.

It is to be understood that, even though numerous characteristics and advantages of various embodiments of the present invention have been set forth in the foregoing description, together with details of the structure and function of various embodiments of the invention, this detailed description is illustrative only. Changes may be made in detail, especially in matters of structure and arrangements of parts within the principles of the present invention to the full extent indicated by the broad general meaning of the terms in which the appended claims are expressed without departing from the spirit and scope of the present invention.

In addition, although the embodiments described herein are directed to a tab-lock fastener for vent pipe, it will be appreciated by those skilled in the art that the tab-lock fastener can be used for other devices without departing from the spirit and scope of the claimed invention.

What is claimed is:

1. A tab-lock fastener for securing a first vent pipe section to a second vent pipe section, each of the first and second vent pipe sections having a formed male end and a formed female end, the tab-lock fastener comprising:

a guide formed on the male end of each of the first and second vent pipe sections, the guide comprising:
an entry area;
a slot; and
a tab-lock receptacle;
an engaging tab formed on the female end of each of the first and second vent pipe sections; and
a locking tab defined on the female end of each of the first and second vent pipe sections of vent pipe;
wherein the first vent pipe section is joined to the second vent pipe section by inserting the engaging tab of the first vent pipe section into the entry area of the second vent pipe section and rotating the first vent pipe section with respect to the second vent pipe section so that the engaging tab of the first vent pipe section matingly engages the slot of the second vent pipe section, and wherein the first vent pipe section is secured to the second vent pipe section by pressing the locking tab of the first vent pipe section inwardly.

2. The tab-lock fastener of claim 1 wherein the locking tab is formed in a longitudinal direction.

3. The tab-lock fastener of claim 1 wherein the first vent pipe section and the section are B-vent pipe having an inner wall supported concentrically inside an outer wall.

4. A vent pipe having a male end and a female end, comprising:

a guide formed on the male end of the vent pipe, the guide comprising:
an entry area;
a slot; and
a tab-lock receptacle;
an engaging tab formed on the female end of the vent pipe; and
a locking tab defined on the female end of the vent pipe, and
wherein a first section of the vent pipe connects to a second vent pipe section of the vent pipe by inserting the engaging tab of the first vent pipe section into the entry area of the second vent pipe section and rotating the first vent pipe section with respect to the second vent pipe section so that the engaging tab of the first vent pipe section engages the slot of the second vent pipe section; and
wherein the first vent pipe section is locked to the second vent pipe section by pressing the locking tab inward.

5. A tab-lock fastener for securing a first vent pipe section to a second vent pipe section, each of the first and second vent pipe sections having a formed male end and a formed female end, the tab-lock fastener comprising:

a guide formed on the male end of each of the first and
second vent pipe sections, the
guide comprising:
an entry area;
a slot; and
a tab-lock receptacle located between the entry area and
the slot;
an engaging tab formed on the female end of each of the
first and second vent pipe sections; and
a locking tab defined on the female end of each of the first
and second vent pipe sections of vent pipe, and
wherein the first vent pipe section is joined to the second
vent pipe section by inserting the engaging tab of the first
vent pipe section into the entry area of the second vent pipe
section and rotating the first vent pipe section with respect
to the second vent pipe section so that the engaging tab of
the first vent pipe section matingly engages the slot of the
second vent pipe section, and wherein the first vent pipe
section is secured to the second vent pipe section by pressing
the locking tab of the first vent pipe section inwardly.

6. The tab-lock fastener of claim 5 wherein the locking tab
is formed in a circumferential direction.

7. A tab-lock fastener for securing a first vent pipe section
to a second vent pipe section, each of the first and second
vent pipe sections having a formed male end and a formed
female end, the tab-lock fastener comprising:
a guide formed on the male end of each of the first and
second vent pipe sections, the
guide comprising:
an entry area;
a slot; and
a tab-lock receptacle;
an engaging tab formed on the female end of each of the
first and second vent pipe sections; and
a locking tab defined on the female end of each of the first
and second vent pipe sections of vent pipe, and wherein
the tab-lock receptacle is an inwardly-embossed receptacle with a slot.

8. The tab-lock fastener of claim 7 wherein the first vent
pipe section is joined to the second vent pipe section by
inserting the engaging tab of the first vent pipe section into
the entry area of the second vent pipe section and rotating
the first vent pipe section in a first direction with respect to
the second vent pipe section so that the engaging tab
matingly engages the slot of the second vent pipe section.

9. The tab-lock fastener of claim 8 wherein the first vent
pipe section is secured to the section by, after rotating the
first vent pipe section with respect to the second vent pipe
section to join the first and second vent pipe sections,
rotating the first vent pipe section in a direction opposite to
the first direction so that the engaging tab engages the slot
of the inwardly-embossed receptacle.

10. A tab-lock fastener for securing a first vent pipe
section to a second vent pipe section, each of the first and
second vent pipe sections having a formed male end and a
formed female end, the tab-lock fastener comprising:
a guide formed on the male end of each of the first and
second vent pipe sections, the
guide comprising:
an entry area;
a slot; and
a tab-lock receptacle;
an engaging tab formed on the female end of each of the
first and second vent pipe sections; and
a locking tab defined on the female end of each of the first
and second vent pipe sections of vent pipe, the locking
tab is formed in a longitudinal direction; and
wherein the tab-lock receptacle is located on the entry area.

11. The tab-lock fastener of claim 10 wherein the locking
tab is aligned with the entry area when the first vent pipe
section is secured to the second vent pipe section.

12. The tab-lock fastener of claim 11 wherein the first vent
pipe section is secured to the second vent pipe section by
inwardly biasing the locking tab of the first vent pipe section
prior to engaging the engaging tab of the first vent pipe
section with the slot of the second vent pipe section.

13. A tab-lock fastener for securing a first vent pipe
section to a second vent pipe section, each of the first and
second vent pipe sections having a formed male end and a
formed female end, the tab-lock fastener comprising:
a guide formed on the male end of each of the first and
second vent pipe sections, the
guide comprising:
an entry area;
a slot; and
a tab-lock receptacle;
an engaging tab formed on the female end of each of the
first and second vent pipe sections; and
a locking tab defined on the female end of each of the first
and second vent pipe sections of vent pipe; and
wherein the first vent pipe section and the second vent pipe
section are B-vent pipe having an inner wall supported
concentrically inside an outer wall and having insulation
positioned between the inner wall and the outer wall.

14. A vent pipe having a male end and a female end,
comprising:
a guide formed on the male end of the vent pipe, the guide
comprising:
an entry area;
a slot; and
a tab-lock receptacle;
an engaging tab formed on the female end of the vent
pipe; and
a locking tab defined on the female end of the vent pipe,
and
wherein a first section of the vent pipe connects to a
second vent pipe section of the vent pipe by inserting
the engaging tab of the first vent pipe section into the
entry area of the second vent pipe section and rotating
the first vent pipe section with respect to the second
vent pipe section so that the engaging tab of the first
vent pipe section engages the slot of the second vent
pipe section, and
wherein the first vent pipe section is locked to the second
vent pipe section by pressing the locking tab inward, and
wherein the first vent pipe section is unlocked from the
second vent pipe section by prying the locking tab upward.

15. A vent pipe comprising:
a first double-wall vent pipe section having a male and
female end and having an inner wall and an outer wall;
a second double-wall vent pipe section having a male and
female end and having an inner wall and an outer wall;
means for joining the first vent pipe section to the second
vent pipe section, said means comprising:
a guide formed on the male end of each of the first and
second vent pipe section, the guide comprising an
entry area and a slot; and
an engaging tab formed on the female end of each of
the first and second vent pipe sections, wherein the
first vent pipe section is joined to the second vent
pipe section by inserting the engaging tab of the first
vent pipe section into the entry area of the second
vent pipe section; and rotating the first vent pipe section with respect to the second vent-pipe section so that the locking tab of the first vent pipe section engages the entry area of the second vent pipe section, and means for locking the first vent pipe section to the second vent pipe section, said means comprising:
  a locking tab; and
  a tab-lock receptacle, wherein the locking tab is pressed into the tab-lock receptacle after the first vent pipe section is joined to the second vent pipe section to prevent rotation of the first vent pipe section with respect to the second vent pipe section, and wherein at least one of the inner walls and an outer walls of the first and second vent pipe sections are made of aluminum and wherein at least one of the inner walls and the outer walls of the first and second vent pipe sections are made of steel; and wherein insulation is positioned between the inner and outer walls of the first and second vent pipe sections.

\* \* \* \* \*